Oct. 11, 1960     E. W. BUCK     2,955,491
POWER FEED
Filed Feb. 17, 1958     3 Sheets-Sheet 2
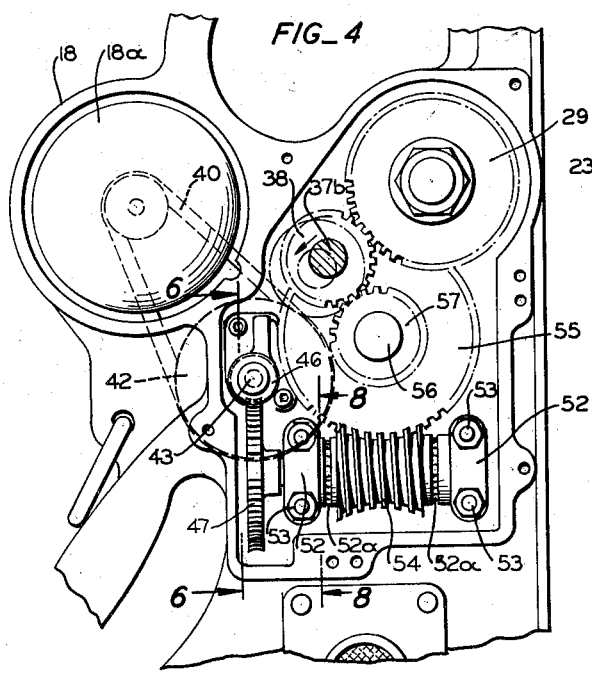
FIG_4
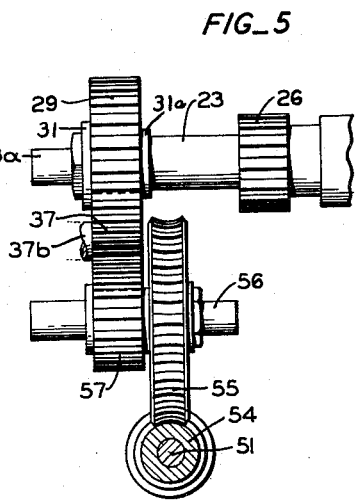
FIG_5
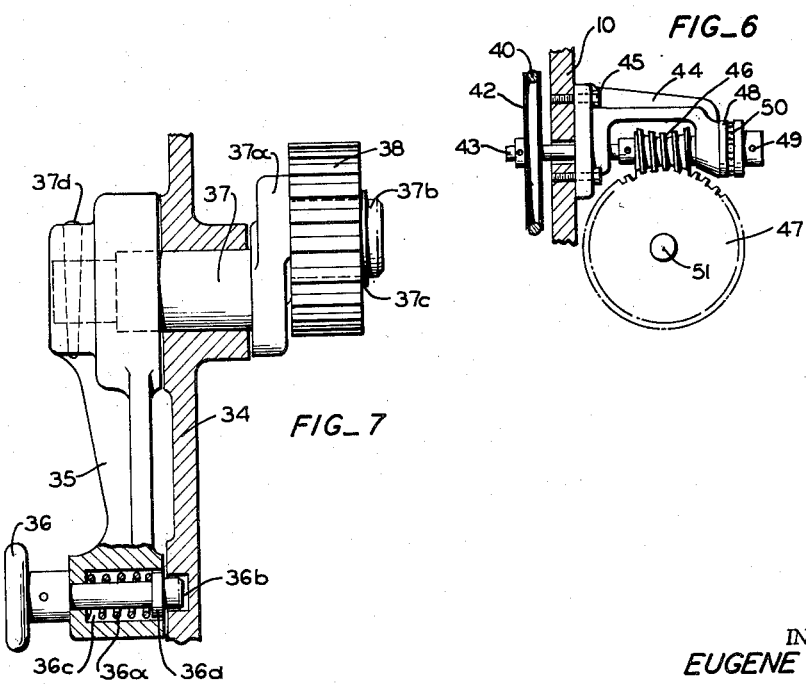
FIG_6
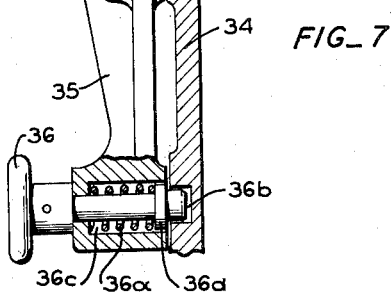
FIG_7
INVENTOR.
EUGENE W. BUCK
BY Allen & Chromy
ATTORNEYS Oct. 11, 1960
E. W. BUCK
2,955,491
POWER FEED
Filed Feb. 17, 1958
3 Sheets-Sheet 3
FIG_9
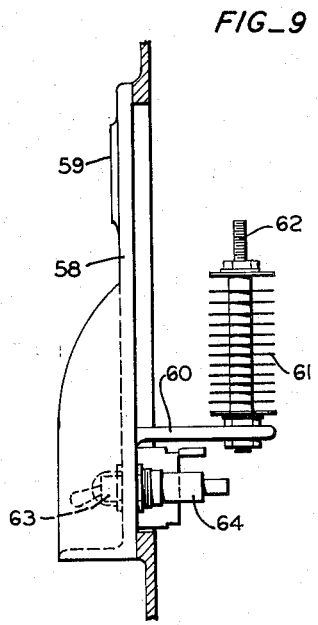
FIG_10
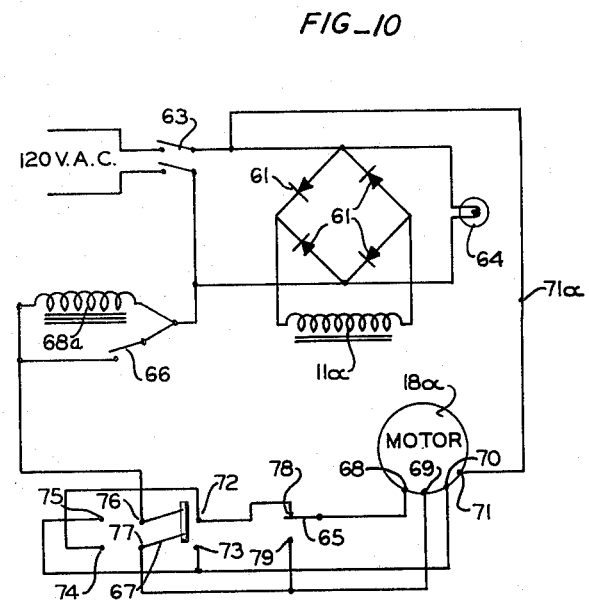
FIG_8
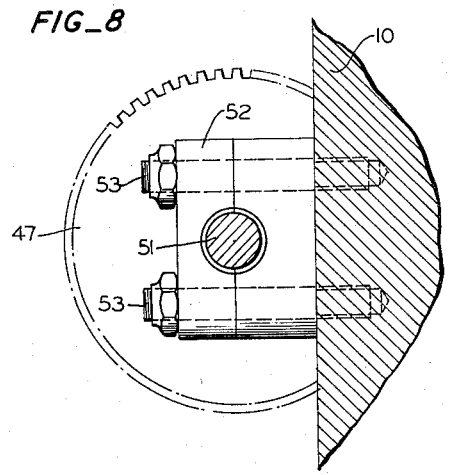
INVENTOR.
EUGENE W. BUCK
BY *Allen & Clurong*
ATTORNEYS

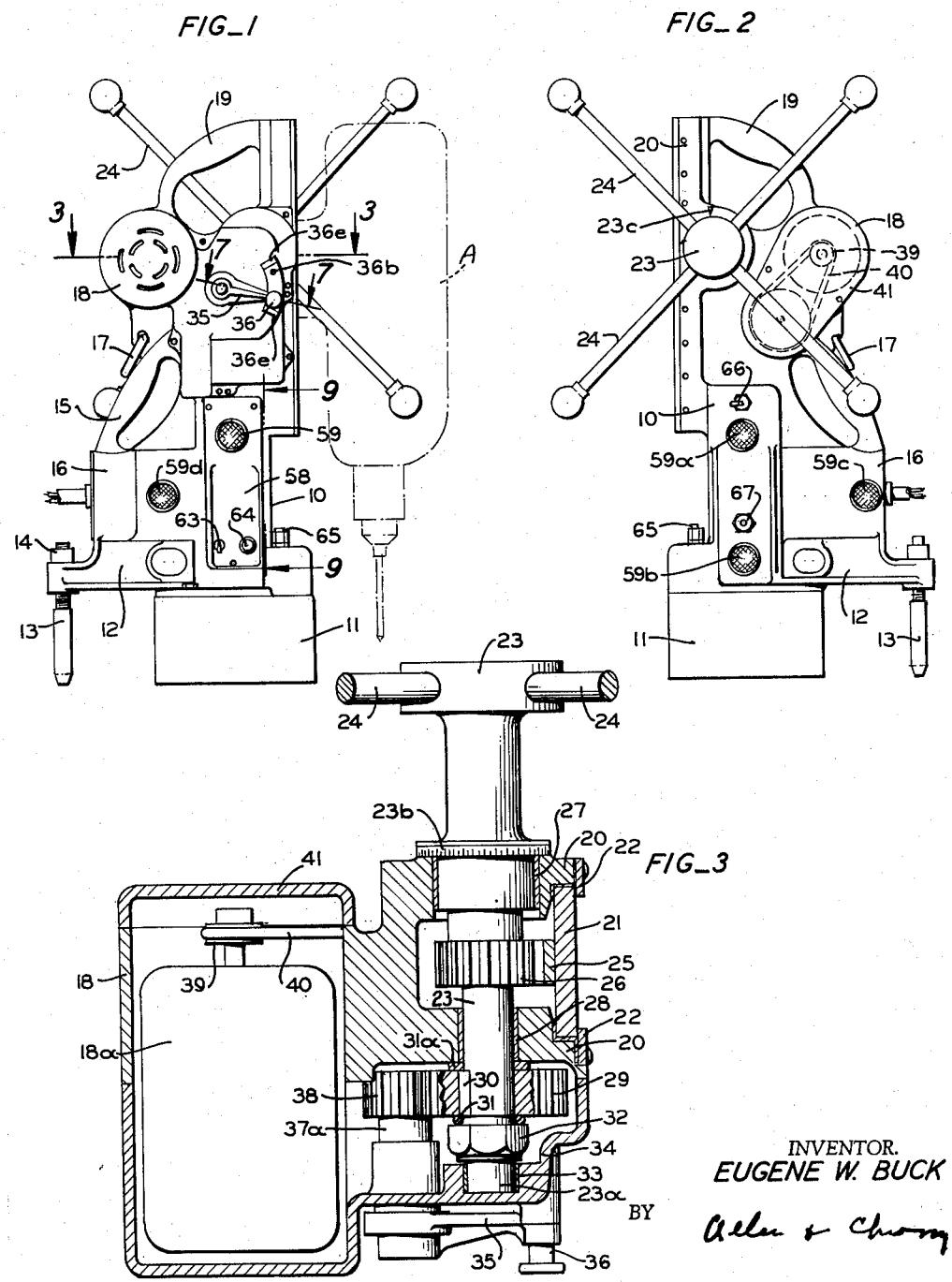

United States Patent Office 2,955,491
Patented Oct. 11, 1960

2,955,491

POWER FEED

Eugene W. Buck, Campbell, Calif., assignor to Buck Manufacturing Company, San Jose, Calif., a corporation of Delaware Filed Feb. 17, 1958, Ser. No. 715,584

12 Claims. (Cl. 77—33.4)

This invention relates to a power feed for cutting tools such as electric drills and the like. More particularly this invention relates to a power feed for cutting tools such as electric drills which is adapted to be supported by an electromagnetic mount or base.

An object of this invention is to provide an improved power feed for cutting tools such as electric drills.

Another object is to provide an improved power feed for cutting tools in which the power feed may be operated at different speeds.

A further object of this invention is to provide an improved electrical power feed for cutting tools such as drills, in which the power feed is provided with a limit switch for interrupting the forward feed of the cutting tool after predetermined extent of feed, for the drilling of blind holes, for example, said limit switch also being arranged to permit reversal of said feed after forward feed is interrupted.

Still another object of this invention is to provide an improved semiautomatic portable electric drill that is adapted to be supported by an electromagnetic base upon the work piece and in which the drill is advanced into the work piece by means of an electrically driven feed mechanism which is adapted to be stopped automatically when the drill bores into the work piece to the desired depth.

Still another object of this invention is to provide an improved electrical power feed for electric drills wherein separate electric motors are employed for driving the drill and for operating the power feed and wherein the drilling unit including the power feed is provided with a magnetic base for supporting the unit on a magnetic work piece so that the unit may be employed to drill into the work piece with substantially reduced effort on the part of the operator, particularly where the work piece is located overhead or in some other hard to get at place.

Still a further object of this invention is to provide an improved electric drill unit that is provided with a power feed employing a reduction gearing which is arranged to be connected to shift the slidable support of the electric drill, said reduction gearing being provided with an idler gear that is continuously engaged with a slow gear of the reduction gearing and is adapted to be brought into mesh with a gear that is supported by the pinion shaft associated with the slidable support.

Other and further objects of this invention will be apparent to those skilled in the art to which it relates from the following specification, claims and drawing in which briefly:

Figure 1 is a side elevational view of a portable electric drill embodying this invention;

Figure 2 is another side elevational view of this invention;

Figure 3 is an enlarged sectional view taken along the line 3—3 of Figure 1;

Figure 4 is an enlarged view showing the interior of the reduction gear box employed in the power feed;

Figure 5 is a detail view of some of the speed reduction gears employed in the power feed and positioned in the gear box;

Figure 6 is a sectional view taken along the line 6—6 of Figure 4;

Figure 7 is a sectional view taken along the line 7—7 of Figure 1;

Figure 8 is a sectional view along the line 8—8 of Figure 4;

Figure 9 is a sectional view taken along the line 9—9 of Figure 1 showing the mounting for the rectifier employed for rectifying the alternating current for the electromagnetic base; and Figure 10 is a schematic wiring diagram for this apparatus.

This invention comprises an electric drill A illustrated in broken lines attached to a slidable support which may be moved up and down either manually or by a power feed arrangement. It is preferred to feed the drill bit into the work piece by means of the power feed that is driven by a separate motor which is mechanically coupled to the shaft associated with the drill supporting slide, and to withdraw it manually. The mechanical coupling includes a belt which transmits power to the input gear of a speed reduction gearing comprising a series of worm wheels and worm gears which are coupled to an idler gear that may be made to mesh with a gear on the aforesaid shaft for the purpose of rotating this shaft either forward to feed the drill into the workpiece or in reverse to withdraw the drill. The rotation of the reduction gearing may also be reversed by reversing the electric motor driving the power feed so that pressure on the idler gear may be relieved, for example when a blind hole is drilled to the proper depth, so that the idler gear may be disengaged and the drill withdrawn from the workpiece manually at a more rapid rate than would be possible with the power feed in reverse.

Referring to the drawing in detail there is shown an embodiment of this invention in which the hollow post 10 is attached to the base 11 having an electromagnetic winding 11a therein which is connected as shown in the schematic wiring diagram, Figure 10, to be energized by rectified alternating current. A rearwardly extending member 12 projects from the bottom part of the post 10 and this member 12 is provided with a threaded hole for receiving the threaded portion of the stabilizer leg 13. This leg is provided with a nut 14 for holding it at a predetermined adjusted position in which the bottom of the leg engages the work piece and provides a brace when the drill bit engages the work piece in the drilling operation.

A hollow housing 16 that is provided with ventilating holes 59c and 59d as shown in Figures 1 and 2 is formed integral with one side of the post 10 and with the top portion of the member 12. This housing is provided for the purpose of enclosing a reactor, the function of which will be set forth in detail hereinafter. Handles 15 and 19 are also provided to the post 10, the handle 15 being positioned at the intermediate or mid portion of the post and the handle 19 being positioned at the top portion thereof. A shackle loop 17 is positioned above the handle 15 for the purpose of receiving a supporting rope or chain which prevents the drilling machine from falling from an overhead support in case of failure of the electric current supply to the electromagnet.

The housing 18 for receiving the electric motor that is employed for driving the power feed mechanism is positioned between the handles 15 and 19 and this housing is preferably made integral with the frame member or post 10. This housing 18 is made of a size such that the cavity therein is adapted to receive the motor 18a as shown in Figure 3 so that the motor may be held fixed therein by set screws (not shown). One side of the post 10 is provided with slide receiving members 20 which are adapted to receive the slidable support 21, as shown in Figure 3, to which the electric drill mechanism that is shown in dotted outline in Figure 1 is adapted to be attached. The slidable support 21 is held in position between the members 20 by means of the retaining strips 22 that are attached to the members 20.

The pinion shaft 23, one end of which is provided with a plurality of handle rods 24 is supported by bearings 27 and 28 that are lodged in suitable holes formed in the post 10. This pinion shaft is provided with a flange on which the scale 23b is positioned as shown in Figure 3 and this scale is adapted to cooperate with the index mark 23c positioned on the post as shown in Figure 2, to indicate the depth to which the drill bit has penetrated the work piece. A pinion 26 is fixedly attached to the shaft 23 and this pinion is arranged to mesh with the teeth of the rack member 25 that is attached to the inner side of the slide 21. A gear 29 is positioned on the shaft 23 and is fixed thereon against rotation, by the key member 30. A hexagonal nut 32 is provided to the shaft 23 for retaining the gear 29 in position on this shaft. A washer 31 is positioned between the hexagonal nut 32 and one side of the gear 29 and another washer 31a is positioned between the other side of the gear 29 and the bearing 28 which is supported in a suitable hole formed in the member 20. The end 23a of the shaft 23 is positioned in the bearing 33 which is supported in a recess formed in the cover plate 34, shown in Figure 3. This cover plate is provided to close the gear box in which the reduction gearing shown in Figure 4 is positioned.

The cover 34 is also provided with a suitable hole for receiving the shaft 37, shown in Figure 7, that is provided with an off-set member 37a to which is attached the shaft 37b that supports the idler gear 38. A suitable retaining washer 37c is provided to this shaft 37b for retaining the idler gear 38 thereon. The shaft 37 extends to the outside of the cover 34 and the lever 35 which is provided for the purpose of rotating the shaft 37 is attached to the outer end of this shaft by means of the key pin 37d. The lever 35 is provided with a spring biased pin 36 for the purpose of locking this lever into one of its two positions. The spring 36a is lodged in a recess formed in the end of the lever 35 and it encircles the pin 36 extending between the shoulder 36d formed on the pin 36 and the inner end wall of this cavity so that the pin 36 is urged by said pin into the hole 36b of the cover plate 34. The cover plate 34 is provided with a pair of holes such as the hole 36b for receiving the pin 36 and these holes function to hold the lever 35 either in its upper or lower position, the lower position which is the position in which the idler gear 38 meshes with the gear 29, is shown in Figure 1.

The lever 35 may be moved through a small arc between suitable stops 36e formed in the cover plate 34 as shown in Figure 1. The recesses 36b are formed in the cover plate to hold the lever 35 at each extremity of its motion so that when the lever 35 is in its lower position, in which position it causes the idler gear 38 to mesh with the gear 29 it may be held therein. On the other hand when it is desired to move the gear 38 out of mesh with the gear 29 then the lever 35 is moved to its upper position and the spring urged pin 36 entering the upper hole 36b retains the lever in this position.

The idler gear 38 is continuously engaged with the small gear 57 that is fixedly attached to the shaft 56 which also has fixedly attached thereto the gear 55. This gear 55 is driven by the worm 54 that is fixedly attached to the shaft 51 between the thrust bearings 52a and the shaft 51 is supported by the bearings 52 which are supported on the inner surface of the gear box by the bolts 53.

Another gear 47 is fixedly attached to the shaft 51 and this gear 47 is driven by the worm 46 that is fixedly attached to the shaft 43 which is driven by the pulley 42, shown in Figure 6, which is driven by the belt 40 that in turn is driven by the motor pulley 39. The shaft 43 is supported by means of bearings formed in the bracket 44 which is attached to the inside of the gear box by means of the bolts 45. Suitable washers 48 and 49 with ball bearings 50 positioned therebetween are provided to one end of the shaft 43 to function as a thrust bearing during power feed of the drill mechanism.

The rectifier 61 which is provided for the purpose of rectifying the alternating current supplied to the electromagnetic winding 11a is attached to the bracket 60 by means of the bolt 62 that extends through the rectifier and which is electrically insulated therefrom. The bracket 60 is formed integral with the cover plate 58 shown in Figure 9, that forms the cover for the rectifier cavity in the post 10. This cover plate is supported on the post by suitable screws or bolts and it is also provided with a vent 59 which cooperates with the vents 59a and 59b formed on the other side of the post 10 for the purpose of providing air circulation around the rectifier 61 for the cooling thereof.

A double pole switch 63 and a signal light 64 are also mounted on the plate 58. The switch 63 is connected to an alternating current source of supply and controls the current supplied to the full wave rectifier 61 which supplies rectified alternating current to the electromagnetic winding 11a as illustrated in the schematic wiring diagram shown in Figure 10. The signal light 64 is connected across the input of the rectifier 61 to indicate when this rectifier is being energized to supply rectified current to the electromagnetic winding 11a. Current from the A.C. circuit is also supplied to the electric motor 18a which is of the universal A.C.-D.C. type and the rotation of this motor may be reversed by a reversing switch 67 which is a double pole double throw type. The motor 18a is provided with four terminals 68, 69, 70 and 71. The terminal 71 is connected to the switch 63 by the wire 71a. The terminal 68 is connected to the switch blade of the limit switch 65 which is provided with a pair of terminals 78 and 79. One of these terminals 78 is connected to the terminals 72 and 74 of the double throw reversing switch 67 and the terminal 79 is connected to the terminal 69 of the motor 18a and to the blade 77 of the reversing switch 67. The terminal 70 of the motor 18a is connected to the terminals 73 and 75 of the reversing switch 67 and the blade 76 of this reversing switch is connected to one side of the reactor 68a and to one terminal of the reactor shorting switch 66. The other terminal of the reactor 68a and the other terminal of this switch 66 are connected together to the switch 63.

The reactor 68a comprises an iron core which is preferably of laminated construction and which carries a suitable winding such that when this reactor is connected in series with the motor 18a, the speed of this motor is reduced to a suitable slow speed. When it is desired to operate the motor 18a at full speed the reactor 68a is short circuited by closing the switch 66. This reactor 68a is made of a size such that it fits into the cavity formed in the housing 16 that is positioned to one side of the post 10 as shown in Figures 1 and 2. The switch 66 for controlling the shorting of the reactor 68a is positioned on one side of the post 10 as shown in Figure 2. The double pole, double throw switch 67 which is employed for reversing the motor 18a is positioned on the post 10 below the switch 66 as shown in Figure 2. The terminals of these switches 66 and 67 are accessible through the opening that is covered by the cover plate 58 which is positioned on the other side of the post 10. The limit switch 65 is positioned to the front of the post 10 as shown in Figures 1 and 2 and this switch is directly in line of travel of the slide 21 so that when this slide 21 reaches its lowermost position the bottom of the slide operates this limit switch which opens the circuit of the motor and interrupts the forward rotation of the motor 18a. The switch 65 does not, however, prevent reverse rotation of this motor, because when it is actuated, for example, by the slide 21, said switch functions to connect the terminal 68 of the motor to the terminal 69 and therefore sets up the circuit of the motor ready for reverse rotation when the switch 67 is placed into the reverse position. This is an important feature of this invention inasmuch as it enables the operator to reverse the rotation of the motor 18a when drilling blind holes. In such operations when the drill is at the limit of its feed, that is, when the blind hole is of the desired depth, the idler gear 38 is in firm engagement such that it is difficult to disengage it from the gear 29. Reversing the motor 18a for an instant relieves the pressure between these gears and idler gear 38 may be readily moved out of mesh with gear 29 by shifting the lever 35. After the idler gear is disengaged from the gear 29 the shaft 23 may be rotated manually to elevate the slide 21 and the electric drill attached thereto so that the drill is in position to start drilling another hole.

Summarizing the operation of this device, the operator after placing the unit with the electromagnetic base on the work piece, locates the drill point over the center punch mark by operating the handles 24 to move the drill point to the work piece. The electromagnetic winding 11a is then energized by closing the switch 63 which is connected to the power supply circuit through a suitable cord of conventional type. The pilot light 64 should also be energized at this time since it is connected across the input of the rectifier 61. The stabilizer leg 13 is then adjusted to engage the work piece firmly to provide the desired bracing against the work piece.

The proper speed for the power feed as determined from engineering data is then selected and the unit is set either for fast or slow feed by closing the switch 66 if fast feed is desired or leaving it open if slow feed is indicated. The operator next lowers the drill point to contact the work piece by manipulating the handles 24 with his right hand and simultaneously unlatching the pin 36 of the lever 35 so that this lever is free to be moved downward to bring the idler gear 38 into meshing engagement with the gear 29. Thus these gears are caused to mesh simultaneously as the drill point is lifted slightly from the work piece manually whereby the gears are allowed to mesh properly. The electric drill motor is then energized to drive the drill and the power feed motor 18a is turned on by manipulating the switch 67 so that the blades 76 and 77 thereof engage the contacts 72 and 73, respectively, and the motor 18a is connected for forward rotation to feed the drill into the work piece.

Upon drilling through the work piece the feed mechanism is disengaged by moving the lever 35 to its top position, thereby moving the idler gear 38 away from the gear 29. The operator may now raise the drill manually by operating the handles 24. In drilling blind holes it is essential that the power feed be reversed momentarily after the hole is drilled and before the idler gear 38 may be disengaged from the gear 29 as previously described. This is accomplished by moving the reversing switch 67 so that the blades 76 and 77 thereof engage contacts 75 and 74 respectively.

While I have shown a preferred embodiment of the invention it will be understood that the invention is capable of variation and modification from the form shown so that its scope should be limited only by the scope of the claims appended hereto.

I claim:

1. In a power feed for cutting tools such as drills and the like the combination comprising a cutting tool, means for driving said tool, a support for said tool and said driving means, a post having an electromagnetic base for holding said post on a magnetic work piece, means for sliding said support with respect to said post, said last mentioned means including a rotatable member having a pinion engaging a rack attached to said support, said rotatable member having a driving gear attached thereto, an electric motor, a speed reducing gear train connected to said motor for rotating said driving gear of said rotatable member, said gear train including an idler gear, and means for mounting said idler gear on an eccentric so that said idler gear is continuously engaged with a slow gear of said gear train and so that it may be caused to mesh with said driving gear to rotate said rotatable member and the pinion carried thereby for slidably moving said support and advance said tool into said work piece.

2. In a power feed for cutting tools such as drills and the like as set forth in claim 1 further characterized in that said speed reducing gear train is positioned in a cavity formed in said post, a detachable cover plate for said cavity, and means for mounting said eccentric on the inside of said cover plate.

3. In a power feed for cutting tools such as drills and the like as set forth in claim 2 further characterized in that said eccentric is provided with an operating lever positioned on the outside of said cover plate and means for holding said lever in different positions so that said idler gear may be held in or out of mesh with said driving gear.

4. In a power feed for cutting tools such as drills and the like as set forth in claim 2 further characterized in that said cover plate is provided with a recess and bearing for receiving the end of said rotatable member.

5. In a power feed for cutting tools such as drills and the like as set forth in claim 1 further characterized in that there is provided a speed reducing device connected in series with said electric motor and means for rendering said speed reducing device ineffective so that said electric motor may be operated at its rated speed.

6. In a power feed for cutting tools such as drills and the like as set forth in claim 5, further characterized in that said post is provided with a cavity for receiving said speed reducing device, the walls of said cavity having air circulating vents for permitting cooling air circulation to said device.

7. In a power feed for cutting tools such as drills and the like as set forth in claim 6, further characterized in that said speed reducing device comprises a reactor having a winding positioned on a core, and said means for rendering said device ineffective comprises a switch for short circuiting said reactor when said motor is to be operated at rated speed.

8. A portable power driven cutting tool comprising an electric drill, a slidable support for said electric drill, a post having an electromagnetic winding in the base thereof for holding said post on the work piece, means for supporting said slidable support on said post, means having a rotatable element for moving said slidable support and said drill to feed the drill bit into the work piece, said last mentioned means including a speed reducing gear train and an electric motor coupled thereto, said gear train having an idler gear, means for movably supporting said idler gear so that it may be brought into engagement with said rotatable element when it is desired to have said electric motor drive said rotatable element through said reduction gear train, said post having a cavity for receiving said gear train, a limit switch electrically connected to said motor and positioned on said base to be actuated by said slidable support at the lower limit of its sliding movement, and means for contacting said limit switch to interrupt the forward rotation of said electric motor after it has moved said slidable support to said lower limit.

9. In a portable power driven cutting tool as set forth in claim 8, further characterized in that the rotation of said electric motor may be reversed, a reversing switch for said electric motor so that the drill bit may be at least partially withdrawn from said work piece after said limit switch is actuated.

10. In a portable power driven cutting tool as set forth in claim 8, further comprising a reactor connected in series with said electric motor for reducing the speed thereof and an electric switch adapted to be connected across said reactor when said electric motor is to be operated at its rated speed.

11. In a portable power driven cutting tool as set forth in claim 8, further comprising a switch for reversing the direction of rotation of said electric motor, means for reducing the speed of said electric motor connected in series therewith, a switch for rendering said last mentioned means ineffective, a cavity in said post for receiving said reversing switch and said last mentioned switch, said post having an opening therein opposite to said switches so that the connections to said switches are accessible therethrough.

12. In a portable power driven cutting tool as set forth in claim 11, further comprising a cover for said opening, a rectifier for rectifying alternating current supplied to energize said electromagnetic winding, means for mounting said rectifier in said post on said cover so that said rectifier may be removed from said post when said cover is removed.

References Cited in the file of this patent

UNITED STATES PATENTS

| | | |
|---|---|---|
| 1,339,044 | Sears | May 4, 1920 |
| 1,358,025 | Sears | Nov. 9, 1920 |
| 2,545,008 | Senglet | Mar. 13, 1951 |